United States Patent [19]

Olsen

[11] 4,183,327
[45] Jan. 15, 1980

[54] HORSE-FEEDING APPARATUS

[76] Inventor: Edward C. Olsen, 1109 S. 17th St., Escanaba, Mich. 49829

[21] Appl. No.: 818,736

[22] Filed: Jul. 25, 1977

[51] Int. Cl.² ............................................. A01K 5/00
[52] U.S. Cl. ................................................ 119/51.11
[58] Field of Search .......................... 119/51.11, 51.15

[56] References Cited

U.S. PATENT DOCUMENTS

| | | | |
|---|---|---|---|
| 245,795 | 8/1881 | Dias | 119/51.5 X |
| 519,935 | 5/1894 | Winch | 119/51.5 X |
| 609,728 | 8/1898 | Bolinski | 119/51.11 |
| 849,169 | 4/1907 | Stein | 119/51.15 |
| 2,981,229 | 4/1961 | Brown | 119/51.11 X |
| 3,026,845 | 3/1962 | Winter | 119/51.11 |
| 3,144,173 | 8/1964 | France et al. | 119/51.11 X |
| 3,171,385 | 3/1965 | Decker et al. | 119/51.11 |
| 3,180,315 | 4/1965 | Moloney | 119/51.11 |
| 3,196,835 | 7/1965 | Bergevin | 119/51.11 |
| 3,237,807 | 3/1966 | Garvey | 119/51.11 X |
| 3,368,529 | 2/1968 | Ferris | 119/51.11 |
| 3,425,398 | 2/1969 | Buffy et al. | 119/51.11 |
| 3,585,969 | 6/1971 | Neimeyer et al. | 119/51.5 |
| 3,613,641 | 10/1971 | Geerlings | 119/51.11 |
| 3,648,660 | 3/1972 | Esquival | 119/51.11 |
| 3,720,185 | 3/1973 | Aldous et al. | 119/51.11 |
| 3,920,224 | 11/1975 | Fassauer | 119/51.11 X |
| 3,952,705 | 4/1976 | Witmer et al. | 119/51 R |
| 4,027,627 | 6/1977 | Fillion | 119/51.11 |

*Primary Examiner*—Louis G. Mancene
*Assistant Examiner*—Daniel J. Leach
*Attorney, Agent, or Firm*—Neuman, Williams, Anderson & Olson

[57] ABSTRACT

Disclosed is an automatic horse-feeding system in which a measured amount of feed is supplied to one or more horses at frequent intervals during the feeding day of the horse. The system is characterized by a central hopper and a feed-distribution system comprising a motor-driven shaft which provides the multiple functions of agitating the feed within the hopper while driving an impeller distribution assembly which apportions the feed into one or more chutes in the predetermined measured amount. A manually-controllable damper assembly allows for simultaneously feeding different horses at different rates from the same feed hopper, while an adjustable-control circuit provides for presetting of both the interval between feedings and the amount of each feeding.

8 Claims, 11 Drawing Figures

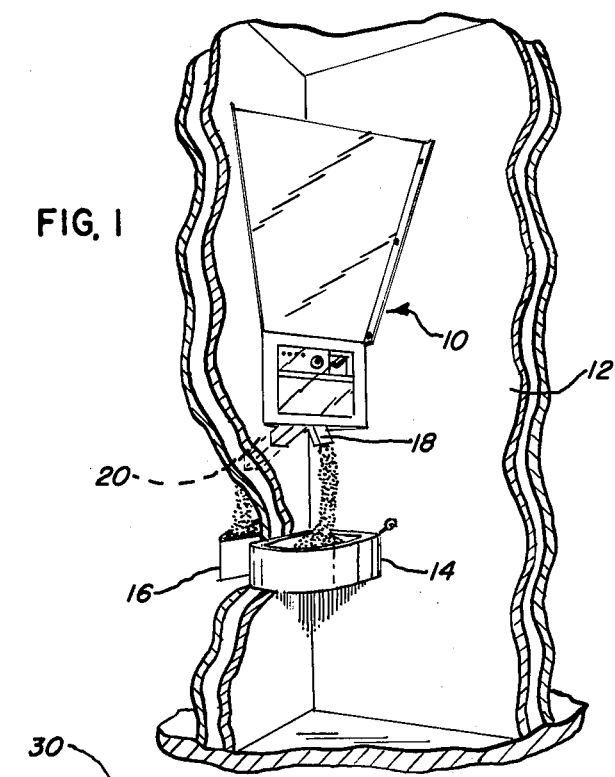
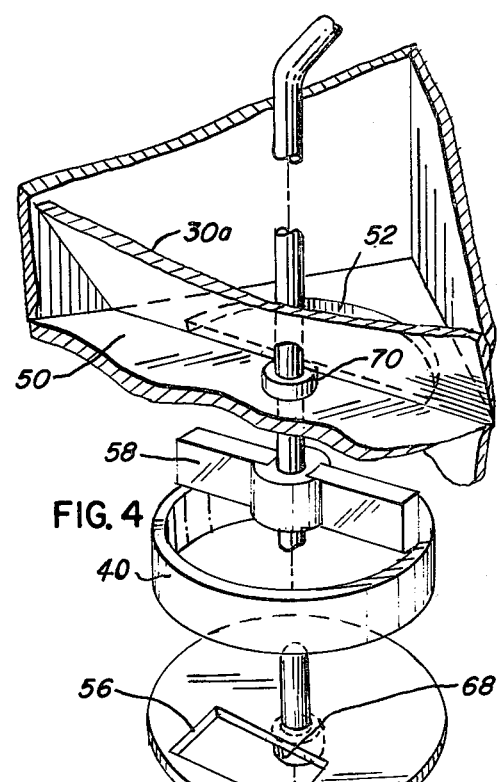
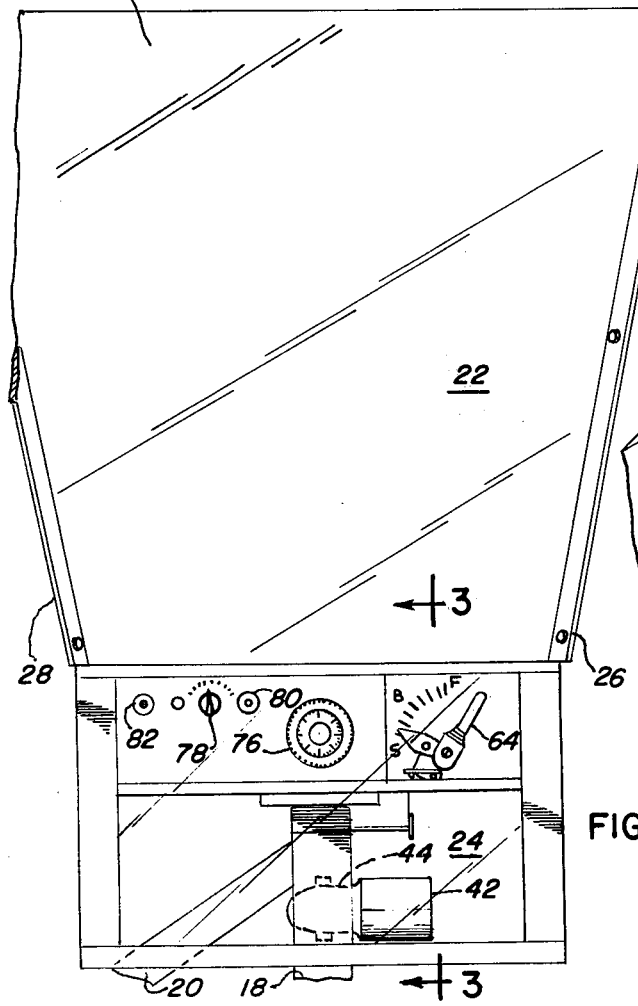
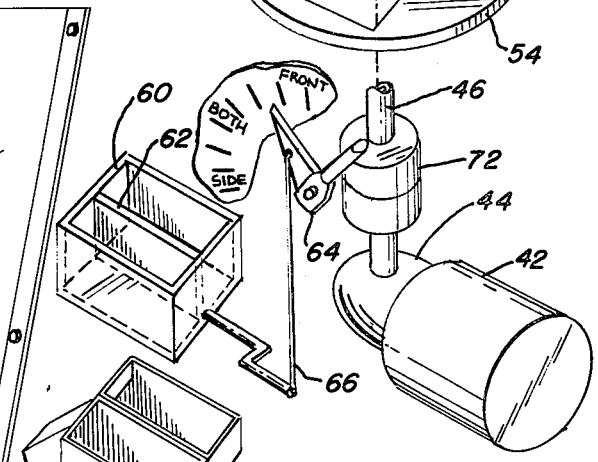
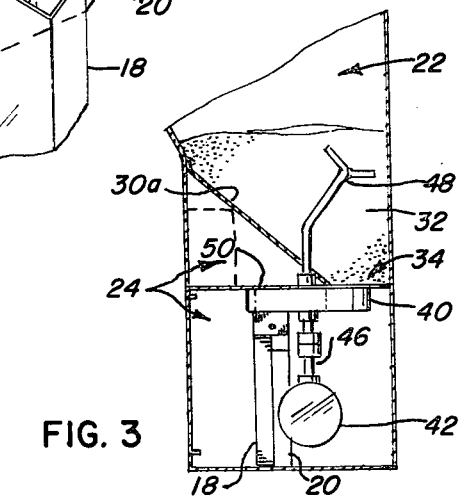

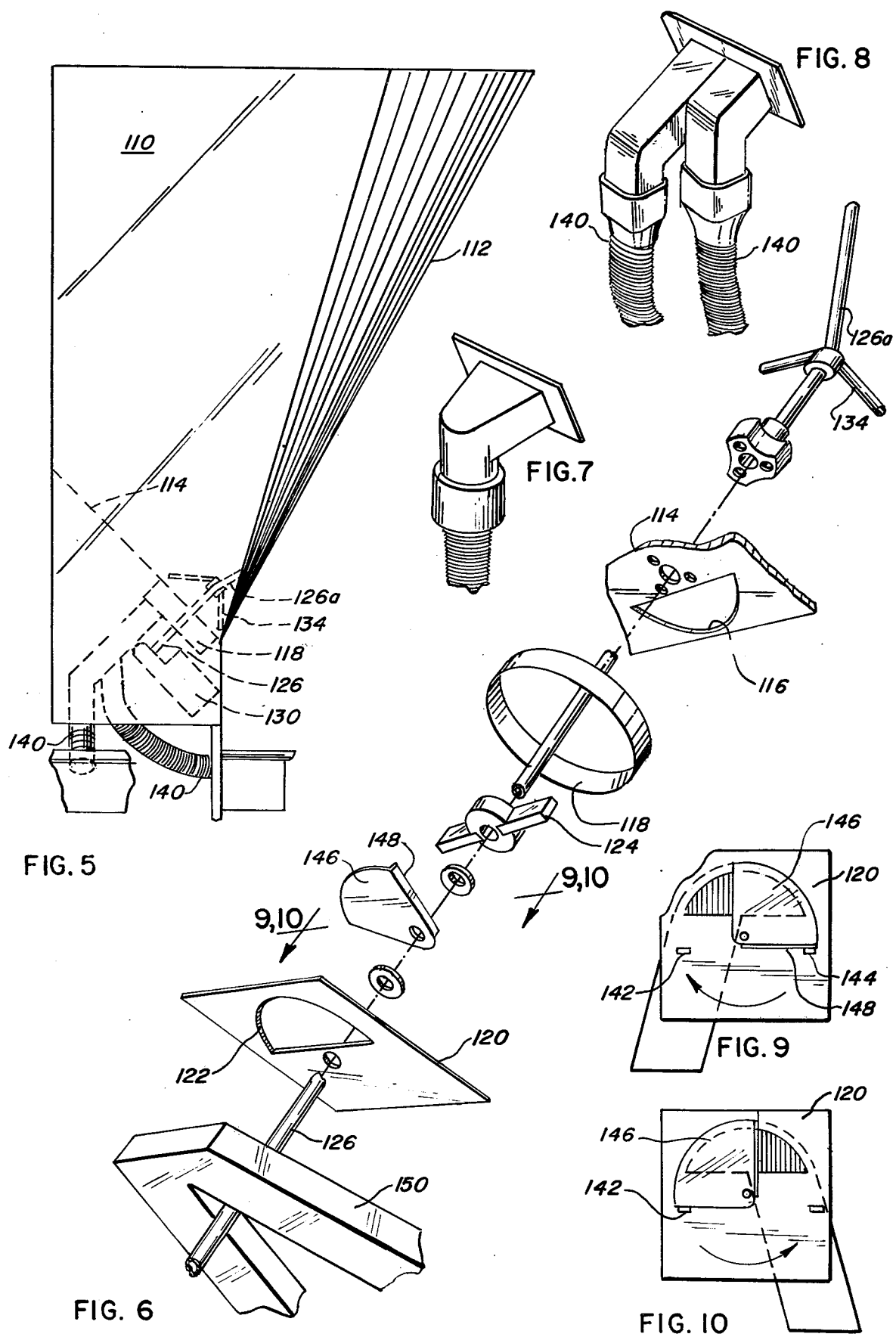

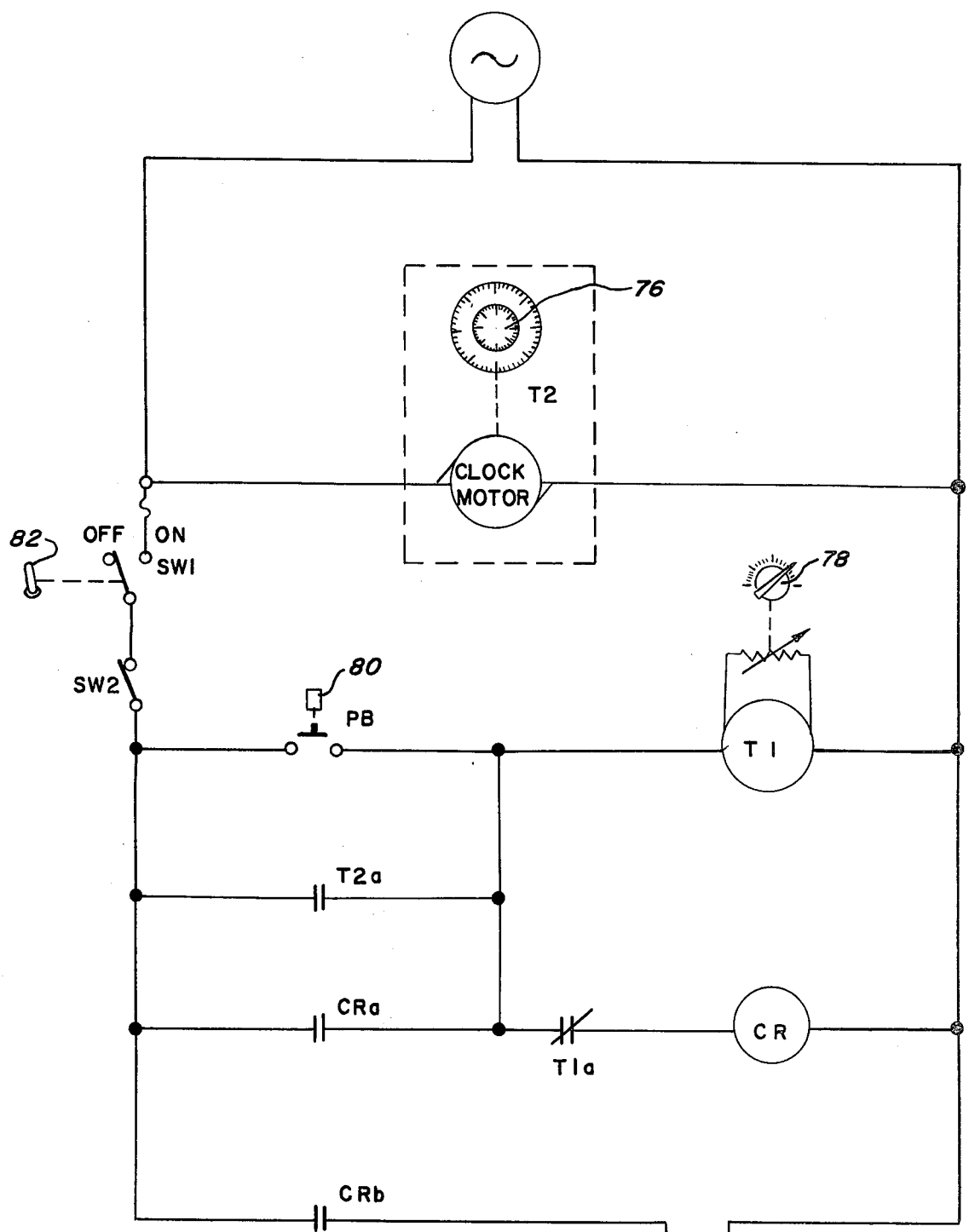
FIG. II

HORSE-FEEDING APPARATUS

FIELD OF THE INVENTION

The invention is related generally to horse-feeding apparatus and more particularly to systems for automatically dispensing feed to horses at frequent intervals over a long period of time.

BACKGROUND OF THE INVENTION

Unlike cows and other ruminant animals, a horse has very little feed storage capacity within its stomach. Cows and other animals may consume and store a large amount of food at one time and digest that same food for nourishment throughout the day, while horses, which have evolved as grazing animals, ideally should eat virtually constantly throughout the day, but in small, controlled amounts capable of being fully digested and processed within the stomach. The proper feeding of a fine thoroughbred, therefore, has in the past required the almost constant attention of a stable boy. Compounding this problem is the fact that each individual horse has his own unique capacity to consume food, as well as his own particular needs for feed mixture (i.e., oats, barley, etc.) These factors, together with the rapid increase in the horse population, particularly in urban areas and areas of high-labor costs, has created an increasing need for efficient and automatic apparatus for supplying the feed requirements of horses with only infrequent manual intervention.

SUMMARY OF THE INVENTION

The feed-distribution system of the present invention is designed to solve the many problems heretofore associated with horse feeding. Specifically, it is an object of the present invention to provide a horse-feeding system which reduces substantially the labor required for the proper feeding of horses. More specifically, it is an object of this invention to provide a feeding system which satisfies the horse's needs for frequent feeding in small amounts throughout the feeding day.

It is a further object of this invention to provide a horse-feeding system which is economical to build, operate, and service. It is a related object to provide an automatic-feeding system employing a minimum of moving parts.

It is another object of the present invention to provide an automatic horse-feeding system which can accommodate many different feed types having a wide variety of consistencies and granule sizes to suit the individual appetites of the horses to be fed.

It is still a further object to provide an automatic horse-feeding system which can supply the feed requirements of a plurality of horses from a single feed source while apportioning the feed in different amounts consistent with the individual needs of the horse being fed.

Other objects and advantages of the invention will become apparent upon reading the following description and appended claims, and upon reference to the accompanying drawings.

BRIEF DESCRIPTION OF THE DRAWINGS

For a more complete understanding of this invention reference should now be made to the embodiments illustrated in greater detail in the accompanying drawings and described below by way of examples of the invention.

IN THE DRAWINGS

FIG. 1 is a perspective view of the horse-feeding apparatus of the present invention as applied to a plurality of stalls.

FIG. 2 is an elevational view of the horse-feeding apparatus of FIG. 1 with the access door removed for revealing the drive mechanism and controls associated with the invention.

FIG. 3 is a side cut-away view of the horse-feeding apparatus of FIGS. 1 and 2.

FIG. 4 is a blown-up view of the drive mechanism for feed agitation, transfer and distribution in the horse-feeding apparatus of the previous Figures.

FIG. 5 is a side view of an alternative embodiment of the present invention.

FIG. 6 is a blow-up of the drive mechanism for agitation, transfer, and distribution of the feed for the embodiment shown in FIG. 5.

FIGS. 7 and 8 depict alternate forms of the feed chute which may be used with the apparatus depicted in FIGS. 5 and 6.

FIGS. 9 and 10 disclose the detailed construction of the bi-directional baffles used for feed distribution in the embodiment shown in FIGS. 5 and 6.

FIG. 11 is a schematic diagram of a control circuit for the embodiment disclosed in FIGS. 1-4.

While the invention will be described in connection with certain preferred embodiments, it will be understood that I do not intend to limit the invention to those embodiments. On the contrary, I intend to cover all alternatives, modifications, and equivalents as may be included within the spirit and scope of the invention as defined by the appended claims.

DESCRIPTION OF THE PREFERRED EMBODIMENTS

Turning now to the drawings, FIG. 1 depicts the horse-feeder 10 mounted in a corner of a stall 12 and supplying a pair of feed basins 14, 16 in adjacent stalls through a pair of dispensing chutes 18, 20, respectively. While the feeder 10 may take any one of a number of external shapes within the scope of the present invention, the corner-mounted unit shown in FIGS. 1–3 is particularly well suited for horse feeding in that it provides a minimum exposure of external surfaces which might be damaged by the horse. As shown in more detail in FIGS. 2 and 3, the feeding apparatus consists generally of an upper chamber or hopper 22 for storing the feed to be dispensed, and a lower section 24 housing the controls and feed-distribution assembly. As shown, the upper chamber has a pair of vertically-extending back walls 26, 28, and a downwardly-converging front surface 30. The angle of incline of the front surface 30 is relatively steep to allow for a smooth flow of the feed, in FIG. 3, in a downward direction. In the area of the controls section 24, the front surface 30 assumes a greater angle of convergence, shown at 30a, toward the side walls 26, 28 and together with side walls 26, 28 forms a lower aperture or outlet 34 for the chamber 22.

For the purpose of transferring feed from the chamber 22 to the chutes 18, 20, there is provided in the lower section 24 a feed-transfer mechanism consisting generally of a cylindrical transfer housing 40 driven by a motor 42 via step-down gearing 44 and a drive shaft 46.

To facilitate the flow of feed through the lower aperture 34 of the storage chamber 22, there is provided an agitating device 48 which penetrates the converging surface 30a of the storage chamber 22 in the vicinity of the aperture 34. For the purposes of economy and reliability, the agitating device 48 is formed as an integral extension of the drive shaft 46 and is driven, together with the feed transfer unit 40, by the single motor 42 and gearing assembly 44.

The mechanism for transferring and distributing the feed is shown more fully in the blow-up of FIG. 4. The cylindrical transfer housing 40 has a horizontally disposed upper surface 50. The surface 50 is a part of a larger plate which provides structural rigidity for the lower section 24 of the unit 10. This upper cylinder surface 50 has an inlet opening 52 covering one angular segment of the chamber defined by the housing 40. The inlet opening 52 lies immediately below and forms a part of the lower aperture 34 of the feed-storage chamber 22. The cylindrical housing 40 further has a lower surface 54 having an outlet opening 56 in one angular segment thereof. The inlet opening 52 and outlet opening 56 are formed in non-overlapping segments of the housing 40 so as to prevent the flow of feed directly through the housing 40 from the inlet opening 52 to the outlet opening 56 during the static condition.

For transferring the feed from the inlet to the outlet opening during normal operation of the unit, there is provided an impeller blade 58 fixedly mounted to the drive shaft 46 for rotation thereby during operation of the motor 42. While the blade 58 is depicted as having two radial extensions, it may also have three or more radial extensions. The blade 58 extends the full vertical distance of the housing 40 so as to separate the housing into multiple chambers which are movable to transfer the feed from the inlet opening to the outlet opening at a selected time and at a selected speed. For the purpose of diverting feed from the transfer housing 40 to the chutes 18 and 20, there is provided a damper assembly 60, which is disposed generally between the outlet opening 56 of the housing 40 and the chutes 18, 20. The damper assembly 60 has a manually-controlled blade 62 which is disposed below and generally perpendicular to the blades of the impeller 58, and which is rotatable about an axis spaced from the outlet opening 56. A manual control 64, suitably calibrated, is coupled to the damper blade 62 by linkage 66 and controls the angle of the blade 62 with respect to the vertical through a predetermined arc. The upper openings of the chutes 18 and 20 are respectively disposed to alternate sides of the blade 62 and are thereby exposed to feed being transferred through the cylindrical housing in proportions controlled by the manual damper control 64.

For ease of operation and maintenance, the drive shaft 46 is coupled to the feed transfer mechanism through suitable bearings 68, 70, and is provided with a flexible coupling 72.

In operation, the upper chamber or hopper 22 is filled at infrequent intervals from the top through an access opening (not shown). At relatively more frequent intervals, the control circuits, discussed below, actuate the motor 42 to begin the transfer of feed from the hopper 22 to the chutes 18 and 20 in proportions preselected on the manual control 64. As the shaft 46 turns, feed falling through the lower aperture 34 of the chamber 22 into the inlet opening 52 of the housing 40 is transferred from one sector of the housing 40 to another in a circular fashion and is pushed across the outlet opening 56. From that point it falls into the chutes 18 and 20. Impeller blade 58 continues rotating across the outlet opening and around to the inlet opening where it contacts and begins to move another volume of feed being deposited through the inlet opening 52. While the impeller blade 58 is being driven, so also is the agitating device 48 at the lower portion of the chamber 22, so that the flow of feed through the transfer housing 40 remains continuous regardless of the consistency or granular size of the feed.

The lower section 24 of the feeder 10 is provided with a hinged front panel, which is not shown, so as to allow for access to the internal controls, but which will, in normal operation, protect the controls of the lower unit from abuse by the animal, as well as from dust and other environmental conditions. The electrical controls governing the automatic operation of the motor 42 are depicted in FIG. 2, and include a feeding clock control 76 for presetting the times during the day at which feeding is initiated. A further control 78 is provided for selectively adjusting the duration, and therefore the amount, of each feeding initiated by the clock control 76. An override button 80 allows the operator to provide an extra feeding by simply overriding the interval timer 76 to drive the motor 42 directly from the power source. Finally, a toggle switch 82 is provided as an ON-OFF switch to allow the operator to discontinue feedings indefinitely without interrupting the operation or settings of the time clock.

A timer and motor-control circuit for operation of the motor 42 in response to the controls 76, 78, 80, and 82 is shown in FIG. 11. Power for the unit is provided from the a.c. line. The motor for the clock or timer T2 is connected directly across the line. The timer T2 controls a pair of normally-open contacts T2a, and closes the contacts at preselected times during each 24-hour interval in accordance with the settings on the timer control 76 (FIG. 2). Operation of the unit is further controlled from the ON-OFF switch 82, which controls a pair of contacts SW1 in series with the line. A second set of series contacts SW2 is provided as a safety limit switch, and is controlled from an interlock switch associated with the access door (not shown) to the storage chamber 22. The switch SW2 disengages the unit during loading.

A time-delay relay T1 controls a pair of normally-closed contacts T1a which are in series with the timer contacts T2a and the energizing coil of a motor power relay CR across the switched a.c. line. The time delay of the relay T1 is adjustable via the interval timer control 78 (FIG. 2) on the main control panel and typically varies from 2 to 11 seconds.

The motor power relay CR includes a pair of normally-open contacts CRa which are disposed in parallel with the timer-relay contacts T2a. Additionally, the motor power relay CR includes a pair of normally-open contacts CRb which lie in series with the drive motor 42 across the switched a.c. line. Also in parallel with the timer contacts T2a is a normally-open switch PB which is controlled from the manual override push button 80 on the front control panel.

Assuming the main control switch 82 has been actuated to the ON position to close the contacts SW1, automatic operation of the unit proceeds in the following manner. As the clock T2 reaches one of the times preset on the panel control 76, the contacts T2a close to provide power to the motor power relay CR through the normally-closed time interval relay contacts T1a.

The contacts CRb of the power relay CR close substantially instantaneously to provide current from the a.c. line to operate the motor 42 and drive the feed-transfer mechanism 40 and agitator 48 described above. Simultaneously the contacts CRa of the power relay CR close to continue power to the relay CR independent of the timer-controlled contacts T2a. Operation of the motor 42 continues until completion of the timed interval established by the setting of the interval-timer control 78 on the front panel, at which time the time-delay relay T1 opens the contacts T1a to interrupt the current being supplied to the power relay CR. As the power relay CR is de-energized, the contacts CRa and CRb assume their normally-open state and operation of the motor 42 ceases.

The motor 42 thereafter remains inoperative, and the transfer of feed through the unit is interrupted until the contacts T2a are again closed by the present timer T2 at the next designated feeding time. The feed cycle can be initiated for an interim feeding at any time by closure of the manual override switch PB via the pushbutton override button 80 on the front panel.

A further embodiment of the present invention is shown in FIGS. 5 through 10. In this embodiment the common shaft for the feed transfer and agitating means is inclined from the vertical so as to lie perpendicular to the principal inclined surface over which feed flows within the storage chamber to allow for greater and more positive agitation of the feed in the lower regions of the chamber. In addition, the distribution or allocating means for the multiple chutes is controlled in accordance with the direction of rotation of the common drive shaft.

To these and other ends, the embodiment shown in FIG. 5 has an upper chamber 110 having a generally triangular horizontal cross-section, but with a frontal surface 112 which is curved, rather than flat as in the previous embodiment. The curvature of the front section facilitates the movement of the agitating means in a manner to be hereinafter described. The other two sides are, as in the previous embodiment, vertically disposed to lie at right angles to each other in the corner of a stall.

Extending from the corner, and converging downward toward the curved front surface 112 of the hopper is an inclined surface 114 having a semi-circular aperture 116 located at its lower end near the confluence with the frontal surface 112. A feed-transfer mechanism bearing some similarities to that described for the previous embodiment lies immediately below the aperture 116, and consists of a cylindrical outer housing 118 which may be formed of any suitable material. At the opposite end of the cylindrical housing 118 opposite the surface 114 is an aperture plate 120 having an outlet opening 122 in a segment thereof which is not overlapping with the inlet opening 116 of the surface 114. An impeller blade 124 is provided on a shaft 126 which intersects the cylindrical housing 118 and operates to transfer feed from the sector of the housing underlying the opening 116 to the sector of the housing overlying the opening 122. The shaft 126 is driven by a motor and gear assembly 130 in a manner hereinafter described.

For agitating the feed granules in the vicinity of the hopper aperture 116, there is provided an integral extension 126a of the shaft 126, which is bent to sweep an arc through the feed adjacent the curved frontal surface of the chamber 110.

To provide a more positive agitation along the principal channeling surface 114 of the hopper, there is additionally provided a pair of fingers 134 mounted on the shaft 126. The downwardly projecting fingers or arms 134 provided agitation over a broad area immediately adjacent the surface 114, while further agitation, resulting from rotation of the shaft extension 126a, occurs immediately thereabove.

For the purpose of channeling feed to one of more feed receptacles, chute means are provided in either a singular form, as shown in FIG. 7, or a dual form, as shown in FIG. 8. In either instance the feed may be channeled to the appropriate feed trough through a flexible and adjustable tubing 140.

For controlling the apportionment of feed between the respective feed receptacles of a dual-receptacle system, the present embodiment includes a bi-directional motor drive mechanism and diverter assembly, as shown in detail in FIGS. 6, 9, and 10. To this end, the apertured plate 120 has a pair of stops 142, 144 on diametrically opposite sides of its upper surface, and a diverter plate 146 which pivots freely about the shaft 126. The diverter plate 146 has a lip 148 formed on one edge thereof which serves to move the plate 146 about its axis under the force of the feed being moved by the impeller blade 124. Depending upon the direction of rotation of the shaft 126, the plate 146 rests either against the stop 142 or the stop 144 so as to cover the right or left halves, respectively, of the semi-circular aperture 122 in the plate 120. As such, feed is allowed to fall into only one of the chutes (and consequently only to one of the stalls) during rotation of the motor in a given direction. See FIGS. 9 and 10. For operation of the unit in the mode just described, the dual chutes may be of the type shown in FIG. 8, or alternatively, of the type shown in FIG. 6 at 150. In either instance, the chutes are separated at a line intersecting the aperture 122 in the plate 120.

Suitable feed-interval and duration-control circuitry is provided to perform the motor control functions in a manner similar to that described above for the previous embodiment. However, in place of the chute control lever 64 of the previous embodiment, apportionment of feed between the two chutes is controlled in the present instance by a manual switch and suitable additional circuitry (not shown) for changing the direction of current through the windings of the motor 130 in accordance with the desired feed apportionment. As noted above, a change in the direction of rotation of the shaft 126 rotates the diverter plate 146 through a 90° arc and changes the flow of feed from one of the adjacent chute openings to the other.

Accordingly, the circuitry of FIG. 11 may, consistent with this embodiment of the invention, be modified and duplicated to provide an additional interval-timing relay similar to the relay T1 and an additional motor-power relay operating in a manner similar to the relay CR, but controlling the flow of current in the opposite direction through the drive motor 130. Automatic dispensing of feed to either or both of the chutes is selected by a suitable manual control provided on the front panel. Separate controls for the time delays of the two interval-timing relays are provided on the front panel to allow the user to tailor the duration of feed dispensing, and therefore the amount of feed dispensed, through each chute of the two-chute system.

From the foregoing, it will be apparent that there has been brought to the art an automatic feeding system which is particularly adapted to the care and feeding of horses and which simplifies the laborious task of providing for the widely varying feeding requirements of individual horses. The apparatus disclosed is inexpensive to build, as well as to maintain, in view of the fact that multiple functions are performed with a minimum number of moving parts. Nevertheless, it provides substantial flexibility in the choice of stalls to be serviced, the duration and amount of food to be dispensed at each serving, and the interval between successive servings. These and other advantages inherent in the apparatus described above not only eliminate much of the manual labor previously attendant to horse feeding, but also provide the animal itself with a predictable and reliable source of feed tailored to its own needs.

I claim as my invention:

1. A system for automatically dispensing horse feed ccomprising:
   a feed storage chamber having an upper access port, a lower aperture and a plurality of side surfaces including at least one which converges downwardly toward the others to channel the feed to said aperture,
   feed transfer means including a substantially closed cylindrical housing axially aligned in a vertical direction below said storage chamber, said housing having an upper surface with an inlet opening disposed below the aperture of said storage chamber, a horizontal lower surface having an outlet opening, and impeller blade means spanning the diameter of said cylinder, said inlet and outlet openings being in non-overlapping segments of said upper and lower surfaces,
   a vertically disposed shaft axially intersecting said cylinder and coupled to said impeller blade for rotationally driving said blade to transfer a volume of feed from a section of said housing under the inlet opening to a section of said housing over the outlet opening,
   means driven by said shaft for agitating the feed within the storage chamber near the lower aperture thereof during rotation of said impeller blade, said agitating means including at least one projecting finger element driven by said shaft and adapted to sweep across said converging surface in close proximity thereto,
   a timer-controlled drive mechanism coupled to said shaft for actuating said agitating means and said impeller blade at predetermined intervals and for a predetermined period and feed serving means for receiving the feed from said housing outlet opening for consumption.

2. A system for automatically dispensing feed to horses according to claim 1 wherein said vertical shaft extends into said feed storage chamber and wherein said agitating means is an integral extension of said shaft disposed at an angle thereto for sweeping an arc through the feed during rotation of the shaft.

3. A system for automatically dispensing feed to horses according to claim 1 wherein a first side of said storage chamber extends angularly upward from said aperture and across the axis of said shaft and wherein said shaft extends through said angularly extending side and is formed within said chamber at approximately the same angle as said first side so as to form said agitating means.

4. A system for automatically dispensing feed to horses in accordance with claim 1 wherein said storage chamber is three-sided and has first and second vertical sides forming a vertical right angle corner and a third side which converges downwardly toward said first and second sides to form said aperture.

5. A system for automatically dispensing horse feed comprising:
   a feed storage chamber having an upper access port, a lower aperture, and a plurality of side surfaces at least one of which converges in the downward direction towards the other surfaces to channel feed into said aperture;
   projecting finger means located near said aperture and adapted to sweep across said converging surface within said chamber for agitating the feed adjacent said surface to facilitate the flow thereof through the aperture;
   feed transfer means including a substantially closed cylindrical housing having an upper surface with an inlet opening in one circular segment thereof for receiving feed channeled through said aperture and a lower surface with an outlet opening in another circular segment thereof which is not overlapping with said inlet opening, said transfer means further including an impeller mechanism disposed within said cylindrical housing and having blade means disposed for rotation about the axis of said housing for transferring feed from the location of said inlet opening to the location of said outlet opening;
   chute means for channeling feed from said outlet opening to a feed area; and
   a drive mechanism including a drive shaft coupled to said impeller mechanism and said agitating means so as to effect a continuous flow of feed from said chamber through said transfer means to a feeding area during operation of said drive shaft.

6. In a system for automatically dispensing feed to horses the combination according to claim 5 wherein the axis of said cylindrical housing is perpendicular to a downwardly converging side surface of said storage chamber and wherein said drive shaft intersects the axis of said cylindrical housing and perpendicularly penetrates said chamber side surface, said agitator means being fixed to said shaft and extending outward along said converging side so as to sweep an arc through the feed over said converging side surface during rotation of the shaft.

7. A system for automatically dispensing horse feed comprising:
   a feed storage chamber having an upper access port, a lower aperture, and a plurality of side surfaces at least one of which converges in the downward direction towards the other surfaces to channel feed into said aperture;
   means located near said aperture within said chamber for agitating the feed to facilitate the flow thereof through the aperture;
   feed transfer means including a substantially closed cylindrical housing having an upper surface with an inlet opening in one circular segment thereof for receiving feed channeled through said aperture and a lower surface with an outlet opening in another circular segment thereof which is not overlapping with said inlet opening, said transfer means further including an impeller mechanism disposed within said cylindrical housing and having blade means disposed for rotation about the axis of said housing for transferring feed from the location of said inlet opening to the location of said outlet opening;
   a drive mechanism including a drive shaft coupled to said impeller mechanism and said agitating means so as to effect a continuous flow of feed from said chamber through said transfer means during operation of said drive shaft; and a pair of chutes having entrance openings below adjacent sectors of said housing outlet opening, said feed transfer means further including a cover plate mounted for rotation freely about said drive shaft and shaped to cover at least one of said adjacent sectors of the outlet opening and a pair of stops positioned at the opposite sides of said outlet opening so as to restrict said plate to a position in which it covers at least one of said adjacent sectors, said cover plate further having edge means protruding into frictional engagement with the moving feed such that said cover plate is rotated at the initiation of each feeding to cover one of the chutes, the selection of chutes depending upon the direction of rotation of said impeller blade.

8. The horse feed dispensing system of claim 7 further including a bidirectional motor for driving said shaft and means for controlling the direction of said motor and shaft in accordance with the desired choice of chutes.

* * * * *